Sept. 27, 1955     P. S. JORGENSEN ET AL     2,718,789
TEMPERATURE COMPENSATION OF INTEGRATING GYROSCOPES
Filed Oct. 5, 1954
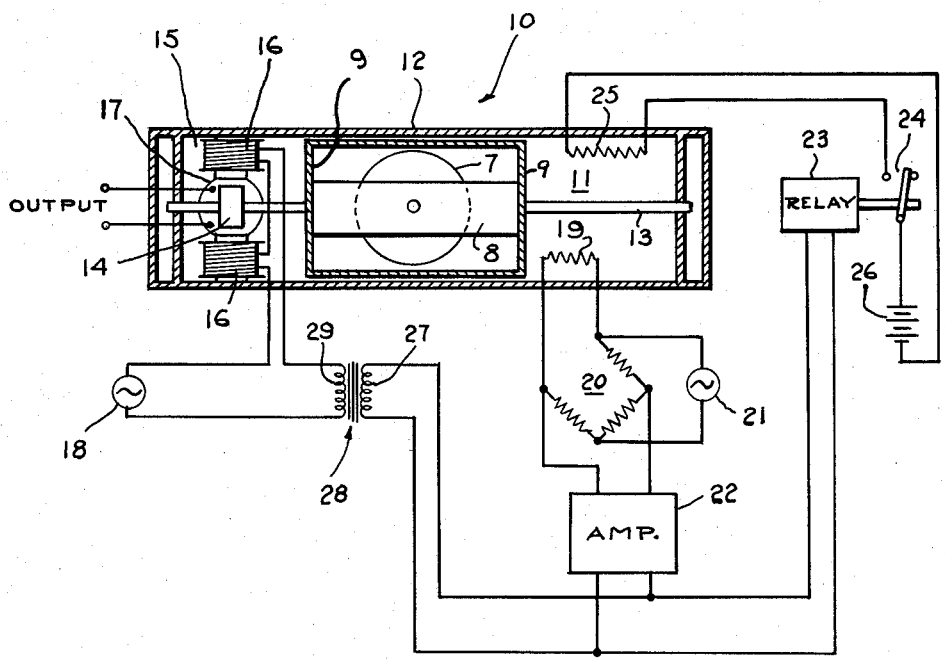
INVENTOR.
PAUL S. JORGENSEN
THEODORE J. NEWMAN
BY
Raymond A. Paquin
ATTORNEY.

United States Patent Office 2,718,789
Patented Sept. 27, 1955

2,718,789

TEMPERATURE COMPENSATION OF INTEGRATING GYROSCOPES

Paul S. Jorgensen, Westbury, and Theodore J. Newman, Forest Hills, N. Y., assignors to American Bosch Arma Corporation, a corporation of New York Application October 5, 1954, Serial No. 460,440

12 Claims. (Cl. 74—5.6)

The present invention relates to integrating gyroscopes and has particular reference to temperature compensation therefor.

An integrating gyroscope contains a gyroscope encased in a cylindrical chamber which is contained in a cylindrical housing filled with high density viscous fluid. The fluid fills the space between the chamber and the housing. The chamber is free to rotate in the fluid, within limits, the only restraining force being the viscous drag developed in the fluid between the chamber and the housing.

The angular displacement of the chamber with respect to the housing, for a given torque developed at the chamber, for example by the precessing gyro, is a function of the viscosity of the fluid and is detected by some type of rotary pickoff device. The output voltage of the pick-off device is therefore proportional to the time integral of the torque developed at the chamber, with the constant of proportionality being a function of the pickoff excitation and the fluid viscosity. The torque at the chamber may also be developed by a torque generator energized by an electrical signal, but for simplicity only the gyroscopic torque will be considered in this description.

The fluid viscosity is dependent on the temperature of the fluid and in present day integrating gyros provision has been made to maintain the temperatures at a substantially constant value above the ambient temperature by using a temperature sensitive device to control a heating device. There is necessarily a slight variation in temperature, however, which occurs because of the practical limitations of the temperature sensing and heating devices. During these changes in temperature the overall scaling, i. e. the voltage output per unit of the time integral of the torque at the gyro chamber, is not constant and an incorrect interpretation of the voltage output results.

The present invention compensates for these slight changes in fluid temperature by varying the excitation of the output device according to the variation in fluid temperature. To this end the temperature error signal normally used to control the heater, properly scaled, is also connected in series with the constant excitation voltage of the pickoff device.

For a better understanding of the invention, reference may be had to the accompanying diagram, the figure which shows schematically a preferred embodiment of the invention.

In the figure, the essential elements of an integrating gyro 10 are shown. The fluid tight shell 12 and the gyro chamber 9 are shown in cross section to reveal their interiors. A gyro wheel 7 is supported in the gimbal ring 8 which is fixed to the cylindrical chamber 9. The spin axis of gyro 7 is perpendicular to the longitudinal axis of cylinder 9. The cylinder 9 is suspended within the cylindrical shell or housing 12 containing a high density fluid 11 which supports the major portion of the weight of chamber 9. Shafts 13, 13 of chamber 9 which are journaled in bearings at the ends of housing 12, while supporting the remainder of the weight, are primarily intended to keep the cylinder 9 in position radially and longitudinally.

One of shafts 13 carries the rotor 14 of a pickoff device 15 which produces a voltage output proportional to the relative angular displacement between the cylinders 9 and 12. The term "proportional to" when applied to a voltage is intended to signify that the magnitude of the voltage is proportional to a value while the sign of the voltage corresponds to the sign of the value.

The pickoff device 15 may be of any suitable type. As shown in Figure 1, the pickoff 15 has a pair of primary windings 16 and a pair of secondary windings 17 (only one is shown) having their magnetic axes displaced by 90°. The solid, substantially dumbbell shaped rotor on shaft 13 varies the coupling between the primary and stator windings. The primary winding 16 is normally energized by a constant voltage from power supply 18 and a voltage is produced in the secondary winding 17 which is proportional to the angular displacement of the rotor 14 from alignment with windings 16 i. e. the relative angular displacement between cylinders 9 and 12.

A temperature sensitive resistor 19 is in intimate thermal contact with fluid 11 and is connected as one arm of a bridge 20. A constant alternating power supply 21 is connected across one diameter of the bridge 20, while the output of the bridge 20 then across the other diameter is connected to the input of amplifier 22. The output of amplifier 22 controls relay 23 which in turn operates switch 24 between the heater resistor 25 and its power supply 26.

When the temperature of fluid 11 is below its nominal value the bridge 20 is unbalanced to produce an error voltage which, amplified in amplifier 25, causes the relay 23 to close switch 24. Resistor 25 is therefore energized and the temperature of the fluid is raised. When the temperature reaches the nominal value, the bridge 20 is balanced and the relay 23 causes switch 25 to open.

The fluid temperature, however, may continue to increase for a short time due to the thermal inertia of the heater 25. Therefore, relay 23 is preferably phase sensitive so that switch 24 will not be closed as the phase of the temperature error signal from bridge 20 reverses when the fluid temperature is higher than nominal.

It will be seen that this temperature stabilization cannot be perfect due to the practical limitations of the apparatus used. Hence, the fluid temperature will vary about the desired nominal value, and the viscosity of the fluid will vary in a similar manner so that the overall scaling of the device (the ratio between the time integral of the torque at cylinder 9 and the output voltage at pickoff 15), will not be constant.

The present invention uses the temperature error signal output of amplifier 22 to vary the excitation of winding 16 of pickoff 15 to make the overall scaling constant. To this end the primary winding 27 of transformer 28 is connected to the output of amplifier 22, while the secondary winding 29 of transformer 28 is connected in series between the power supply 18 and primary winding 16 of the pickoff device 15.

When the viscosity of the fluid 11 is greater than normal, i. e. at low temperatures, the output of transformer 28 increases the excitation of the pickoff device 15 by a proportional amount. Thus the resulting smaller displacement of cylinder 9 with respect to cylinder 12 for a given time integral of the torque at shaft 13 is compensated for by the increased excitation of pickoff device 15. The constant of proportionality between the time integral of torque at the shaft 13 and the output of pickoff device 15 therefore may be maintained at a constant value by choosing the correct ratio between the output of transformer 27 and the output of bridge 20. This ratio is mainly a function of the transformation ratio of transformer 27 and the characteristics of amplifier 22, and is determined by the characteristics of fluid 11, and the excitation voltage from supply 18.

It will be seen that when the viscosity of the fluid 11 is smaller than that at normal temperature (the temperature is higher than normal) the output of amplifier 22 causes the excitation of pickoff device 15 to be decreased. Since the deflection of cylinder 9 would be greater than expected at normal temperature, the excitation of the pickoff is accordingly decreased by the output of transformer 28, again compensating for the charge in overall scaling of the device.

It is clear that for proper operation, the output of secondary winding 29 must be of the same frequency as power supply 18.

We claim:

1. In a device of the character described, a housing, a chamber in said housing having its walls spaced from the walls of said housing, fluid in said housing surrounding said chamber, a pickoff device for indicating the relative displacement between said housing and chamber, a temperature sensitive device associated with said fluid for producing an electrical signal indicative of the variation of the temperature of said fluid from a selected value, an electrical connection between the output of said temperature sensitive device and said pickoff for effecting variation of the excitation of said pickoff with variations in the temperature of said fluid whereby the output of said pickoff is proportional to the time integral of the torque acting on said chamber.

2. In a device of the character described, a housing, a chamber in said housing having its walls spaced from the walls of said housing, fluid in said housing surrounding said chamber, a pickoff device for indicating the relative displacement between said housing and chamber, a temperature sensitive device associated with said fluid for producing an electrical signal indicative of the variation of the temperature of said fluid from a selected value, an electrical connection between the output of said temperature sensitive device and said pickoff for effecting variation of the excitation of said pickoff with increase of the temperature of said fluid whereby the output of said pickoff is proportional to the time integral of the torque acting on said chamber.

3. In a device of the character described, a housing, a chamber in said housing having its walls spaced from the walls of said housing, fluid in said housing surrounding said chamber, a pickoff device for indicating the relative displacement between said housing and chamber, a temperature sensitive device associated with said fluid for producing an electrical signal indicative of the variation of the temperature of said fluid from a selected value, an electrical connection between the output of said temperature sensitive device and said pickoff for effecting variation of the excitation of said pickoff with variations in the temperature of said fluid whereby the output of said pickoff is proportional to the time integral of the torque acting on said chamber and a heating element in said fluid for increasing the temperature thereof.

4. In a device of the character described, a housing, a chamber in said housing having its walls spaced from the walls of said housing, fluid in said housing surrounding said chamber, a pickoff device for indicating the relative displacement between said housing and chamber, a temperature sensitive device associated with said fluid for producing an electrical signal indicative of the variation of the temperature of said fluid from a selected value, an electrical connection between the output of said temperature sensitive device and said pickoff for effecting variation of the excitation of said pickoff with increase of the temperature of said fluid whereby the output of said pickoff is proportional to the time integral of the torque acting on said chamber and a heating element in said fluid for increasing the temperature thereof.

5. In a device of the character described, a housing, a chamber in said housing having its walls spaced from the walls of said housing, fluid in said housing surrounding said chamber, a pickoff device for indicating the relative displacement between said housing and chamber, a Wheatstone bridge circuit, a temperature sensitive device associated with said fluid including a resistor in said fluid connected to one arm of the bridge circuit for producing an electrical signal indicative of the variation of the temperature of said fluid from a selected value, an electrical connection between the output of said temperature sensitive device and said pickoff for effecting variation of the excitation of said pickoff with variations in the temperature of said fluid whereby the output of said pickoff is proportional to the time integral of the torque acting on said chamber.

6. In a device of the character described, a housing, a chamber in said housing having its walls spaced from the walls of said housing, fluid in said housing surrounding said chamber, a pickoff device for indicating the relative displacement between said housing and chamber, a Wheatstone bridge circuit, a temperature sensitive device associated with said fluid including a resistor in said fluid connected to one arm of the bridge circuit for producing an electrical signal indicative of the variation of the temperature of said fluid from a selected value, an electrical connection between the output of said temperature sensitive device and said pickoff for effecting variation of the excitation of said pickoff with increase of the temperature of said fluid whereby the output of said pickoff is proportional to the time integral of the torque acting on said chamber.

7. In a device of the character described, a housing, a chamber in said housing having its walls spaced from the walls of said housing, fluid in said housing surrounding said chamber, a pickoff device for indicating the relative displacement between said housing and chamber, a Wheatstone bridge circuit, a temperature sensitive device associated with said fluid including a resistor in said fluid connected to one arm of the bridge circuit for producing an electrical signal indicative of the variation of the temperature of said fluid from a selected value, an electrical connection between the output of said temperature sensitive device and said pickoff for effecting variation of the excitation of said pickoff with variations in the temperature of said fluid whereby the output of said pickoff is proportional to the time integral of the torque acting on said chamber and a heating element in said fluid for increasing the temperature thereof.

8. In a device of the character described, a housing, a chamber in said housing having its walls spaced from the walls of said housing, fluid in said housing surrounding said chamber, a pickoff device for indicating the relative displacement between said housing and chamber, a Wheatstone bridge circuit, a temperature sensitive device associated with said fluid including a resistor in said fluid connected to one arm of the bridge circuit for producing an electrical signal indicative of the variation of the temperature of said fluid from a selected value, an electrical connection between the output of said temperature sensitive device and said pickoff for effecting variation of the excitation of said pickoff with increase of the temperature of said fluid whereby the output of said pickoff is proportional to the time integral of the torque acting on said chamber and a heating element in said fluid for increasing the temperature thereof.

9. In a device of the character described, a cylindrical shell, a cylindrical chamber within said shell and coaxial therewith, high density viscous fluid filling the space between said shell and said chamber, a pickoff device for indicating the relative displacement between said shell and said chamber, a temperature sensitive device associated with said fluid for producing an electrical signal indicative of the variation of the temperature of said fluid from a selected value and electrical connections between the output of said temperature sensitive device and said pickoff for effecting variations of the excitation of said pickoff with variations in the temperature of said fluid whereby the output of said pickoff is proportional to the time integral of the torque acting on said chamber.

10. In a device of the character described, a cylindrical shell, a cylindrical chamber within said shell and coaxial therewith, high density viscous fluid filling the space between said shell and said chamber, a pickoff device for indicating the relative displacement between said shell and said chamber, a Wheatstone bridge circuit, a temperature sensitive device associated with said fluid including a resistor in said fluid connected to one arm of the bridge circuit for producing an electrical signal indicative of the variation of the temperature of said fluid from a selected value and electrical connections between the output of said temperature sensitive device and said pickoff for effecting variations of the excitation of said pickoff with variations in the temperature of said fluid whereby the output of said pickoff is proportional to the time integral of the torque acting on said chamber.

11. In a device of the character described, a cylindrical shell, a cylindrical chamber within said shell and coaxial therewith, high density viscous fluid filling the space between said shell and said chamber, a pickoff device for indicating the relative displacement between said shell and said chamber, a temperature sensitive device associated with said fluid for producing an electrical signal indicative of the variation of the temperature of said fluid from a selected value and electrical connections between the output of said temperature sensitive device and said pickoff for effecting variations of the excitation of said pickoff with variations in the temperature of said fluid whereby the output of said pickoff is proportional to the time integral of the torque acting on said chamber and a heating element for increasing the temperature of said fluid.

12. In a device of the character described, a cylindrical shell, a cylindrical chamber within said shell and coaxial therewith, high density viscous fluid filling the space between said shell and said chamber, a pickoff device for indicating the relative displacement between said shell and said chamber, a Wheatstone bridge circuit, a temperature sensitive device associated with said fluid including a resistor in said fluid connected to one arm of the bridge circuit for producing an electrical signal indicative of the variation of the temperature of said fluid from a selected value and electrical connections between the output of said temperature sensitive device and said pickoff for effecting variations of the excitation of said pickoff with variations in the temperature of said fluid whereby the output of said pickoff is proportional to the time integral of the torque acting on said chamber and a heating element for increasing the temperature of said fluid.

References Cited in the file of this patent
UNITED STATES PATENTS

| | | |
|---|---|---|
| 2,260,396 | Otto | Oct. 28, 1941 |
| 2,303,641 | Horstman | Dec. 1, 1942 |
| 2,584,472 | Konet | Feb. 5, 1952 |
| 2,585,024 | Lundberg | Feb. 12, 1952 |